United States Patent [19]

Feterl

[11] Patent Number: 4,730,742
[45] Date of Patent: Mar. 15, 1988

[54] APPARATUS FOR LIFTING AN ELONGATE MEMBER

[75] Inventor: Leon G. Feterl, Salem, S. Dak.

[73] Assignee: Core Industries, Inc., Bloomfield Hills, Mich.

[21] Appl. No.: 947,088

[22] Filed: Dec. 29, 1986

[51] Int. Cl.⁴ .............................................. B66C 23/78
[52] U.S. Cl. .................................... 212/189; 212/255; 212/702; 212/142.1
[58] Field of Search ............... 212/169, 189, 195, 232, 212/237, 239, 254, 255, 260, 262, 265, 266, 270, 142.1; 198/303, 304, 311, 314, 318, 508; 414/133

[56] References Cited

U.S. PATENT DOCUMENTS

| | | | |
|---|---|---|---|
| 1,399,130 | 12/1921 | Lewis | 212/265 |
| 2,078,393 | 4/1937 | LeTourneau | 212/265 |
| 2,327,461 | 8/1943 | Rowe | 212/262 |
| 2,804,979 | 9/1957 | Lassiter | 212/265 |
| 4,489,818 | 12/1984 | Franke et al. | 212/265 |

FOREIGN PATENT DOCUMENTS 160110 10/1953 Australia ............................ 212/265

Primary Examiner—Joseph F. Peters, Jr.
Assistant Examiner—Stephen P. Avila
Attorney, Agent, or Firm—Moore & Hansen

[57] ABSTRACT

An apparatus for supportably elevating and lowering material handling apparatus having an elongate member includes two arms radiating upwardly from a base. A lower undercarriage arm is pivotably attached to the elongate member, and the lift arm is attached to a roller support which moves along a rail on the elongate member. The roller support and attached lift arm arm moved by a winch-drawn cable. At least one pair of spaced support sheaves is mounted on the elongate member, and the cable passes under the sheaves. At least one riser post extends upwardly from the base and is attached to the lower undercarriage arm so that it intersects the cable between the spaced support sheaves. A sheave mounted on the riser arm intersects and supports the cable when the elongate member is lowered. As the elongate member is lowered, the riser post supports an increasing portion of the downward load. The net load on the cable is reduced and the elongate member can be elevated from a horizontal or near horizontal position with much less force.

19 Claims, 16 Drawing Figures

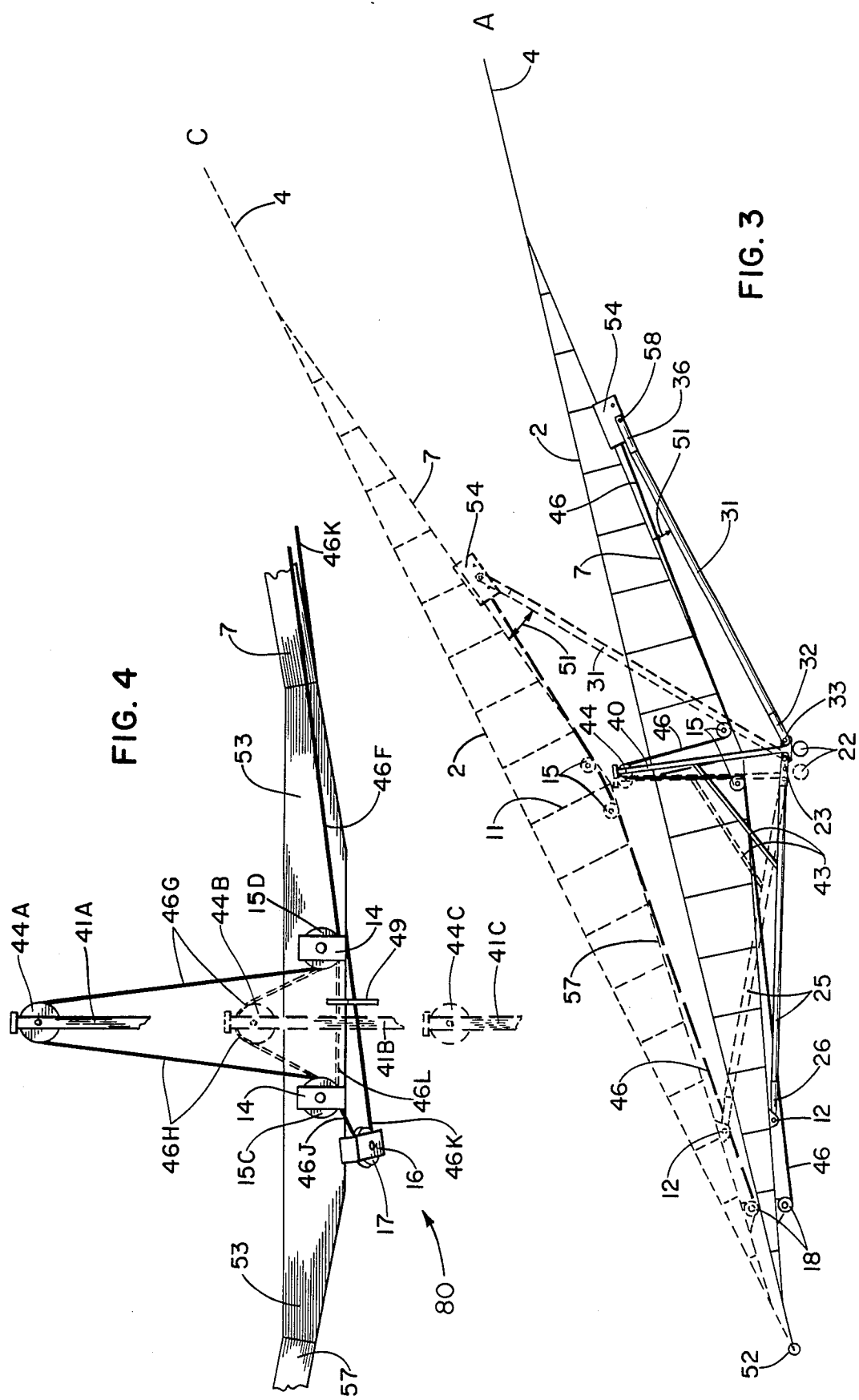

APPARATUS FOR LIFTING AN ELONGATE MEMBER

BACKGROUND OF THE INVENTION

1. Field of the Invention

This invention relates to means for lifting and lowering long members such as conveyors, booms, and the like. More particularly, the invention relates to means for elevating one end of such elongated members.

2. Information Disclosure Statement

Elongated conveyors are widely used for transporting bulk materials from one location to another. Such conveyors may utilize augers, moving belts, endless chains with buckets or plows, or other mechanisms for moving particular materials. For example, rotating augers are conventionally used to transport grains, forage and silage from ground level to the tops of storage elevators, bins and silos for storage therein. Often, the height of the receiving structure is so high that conveyors exceeding 50 feet (15 meters) in length are required. Auger conveyors up to 150 feet or more (46 meters or more) in length are in use for lifting agricultural materials into storage structures, and are commonly wheel mounted to enable travel between storage and work locations.

Transporting the elongate conveyor from one location to another requires that the auger be lowered to a horizontal or near-horizontal position to clear power lines, avoid tipping of the conveyor, and to conform to the clearance height requirements of public roads. For long conveyors, the angle from the horizontal for such travel necessarily becomes very small.

The mechanism for lifting most elongate augers consists of an articulated undercarriage of two arms extending upward from a base to form a triangle with the elongate auger, the latter generally comprising the hypotenuse. The arms pivot relative to each other at the base. At their outer ends, one arm is pivotally mounted to the elongate member, and the other arm is pivotally mounted to slide or roll on a rail along the elongate member. Thus, the fraction of the elongate member which comprises the upper side of the triangle varies in length during the lifting and lowering operations. In order to raise the conveyor, a winch cable attached to the outer end of the slidably mounted arm is retracted along the elongate member to pull the arm toward an upright position. The required force exerted on the cable to move the arm is a function of the angle between the arm and the elongate member, e.g. the auger. As the angle between the arm and the auger approaches zero, as when the auger is in a recumbent position, the force required to lift the auger is much higher than when the angle is larger. At zero angle, the required lifting force on the cable is theoretically infinite. In other words, a force exerted on the cable by the winch produces no lifting force whatsoever on the arm and elongate auger. Therefore, long augers and other elongate members often must be lifted from a lower position by hydraulic cylinders or other means.

SUMMARY OF THE INVENTION

The present invention is an apparatus for supportably elevating and lowering an elongate member such as an auger between a lowered and an elevated position. Both ends of the elongate member may be moved upwardly and downwardly in unison, or one end may be simply elevated and lowered while the other end acts as a pivot point. A longitudinal rail means is attached to the elongate member and is generally coextending with a portion thereof. The elongate member itself may comprise the rail means.

An undercarriage supports the elongate member, and includes a base adapted for stationary installation or mobility, depending on the application. A lower undercarriage arm has its inner end attached to the base, and its opposite, outer end pivotably mounted on the elongate member. An undercarriage lift arm also has its inner end attached to the base, so that it may pivot relative to the lower undercarriage arm. The outer end of the undercarriage lift arm is attached to, and supports, a roller support means which movably supports the elongate member along the rail means.

A riser post means is attached to, and supported by, the base, from which it extends upwardly. The riser post means is adapted to support the elongate member while elevating it from its lowered position and while lowering it to its lowered position. A riser post sheave means is mounted to the upper portion of the riser post means for receiving and supporting a winch cable which communicates with the roller support means. The cable is adapted to be wound on a winch for alternately retracting and extending the cable to move the roller support means along the rail means.

A central sheave means is mounted on the elongate member to guide the cable to and from the riser post sheave means. At the uppermost elevation of the elongate member, the riser post sheave means may be at a level where it supports the cable, or may be at a lower level. In the former case, the elongate member is supported by the riser post at all levels between its uppermost and lowermost elevation. In the latter case, the elongate member is supported by the riser post for only a portion of its travel upward from a lowermost position and its travel downward to the lowermost position. The elongate member is supportably elevated and lowered by the cable moving over the riser post sheave means and under the central sheave means. Preferably, the elongate member in an upper position is above the riser post sheave means, so that the latter provides no support for the winch cable and elongate member when the elongate member is in the fully elevated position, but supports it when it is in a position below a predetermined level, where required lifting forces are highest. For very long augers, for example, the shorter riser post will not itself be an impediment to travel.

This invention enables elongate members to be elevated from a fully lowered position using reduced force. The elongate member may even be elevated from a position below the level of the undercarriage lift arm, because the lifting force is exerted by the cable travelling over the riser post, the latter being normal to the cable movement pulling the lift arm. Ease of lifting and lowering the elongate member is enhanced, and the elongate member may be lowered to a very low position for over-the-road travel. A resultant reduction in forces in the arms enables their construction from materials with lower strength. Another result is more accurate control of the elongate member during its upward or downward movement in the lower sector of its travel.

BRIEF DESCRIPTION OF THE DRAWINGS

FIG. 3 is a side elevation illustrating the principal members of the invention embodiment of FIG. 1 in a lower position and in an elevated position.

FIG. 4 is a fragmentary side elevation of the central sheave means of the embodiment of FIG. 1 mounted on a truss member of the elongate member, together with the riser post means in several positions relative to the central sheave means.

DESCRIPTION OF THE PREFERRED EMBODIMENTS

Figure 1:
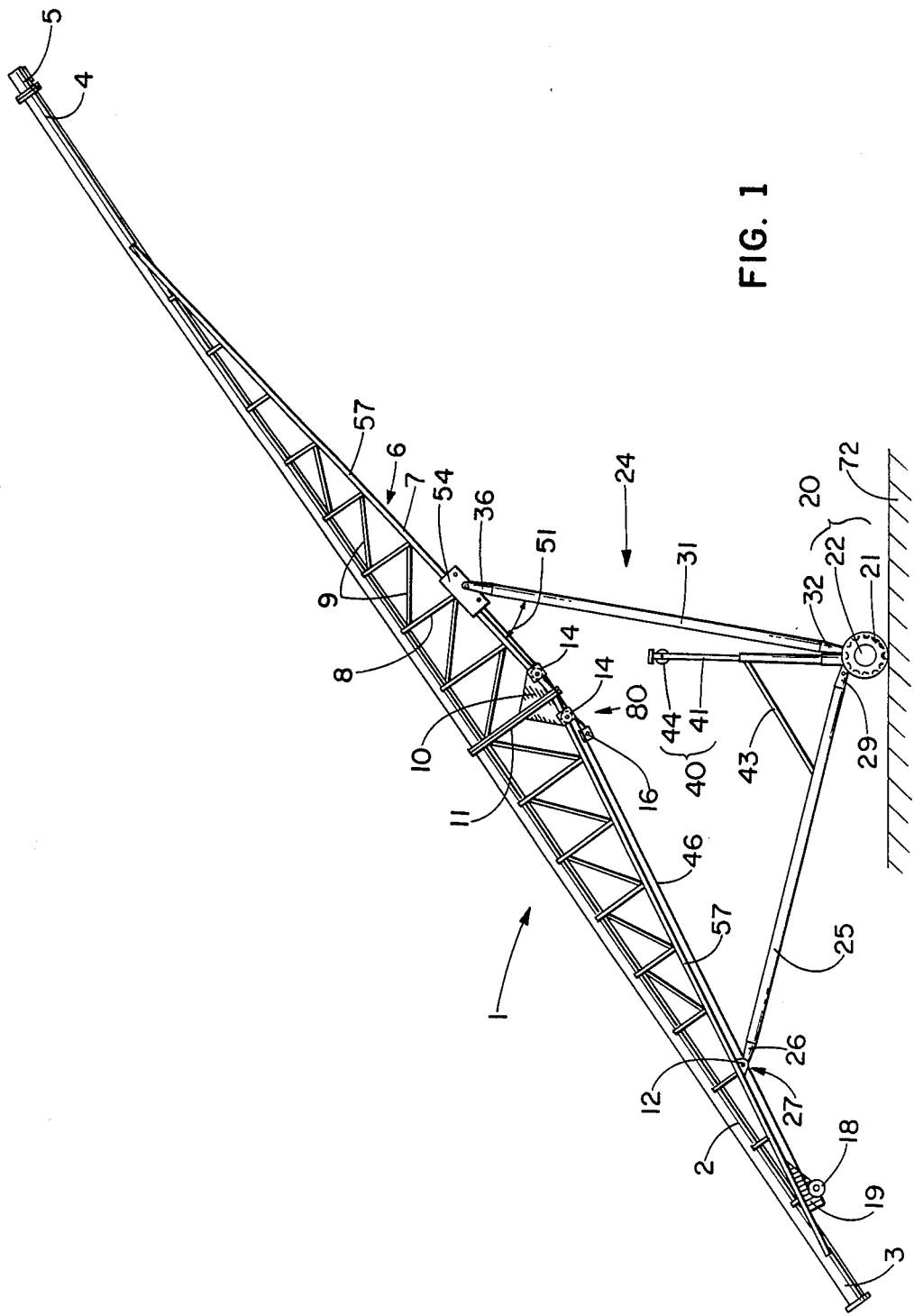
FIG. 1 is a general side view of one embodiment of the invention.

This invention will be described herein and shown in the drawings as applied to a transportable screw conveyor, i.e. an auger. This exemplary use is not intended to limit its use to such an apparatus, but rather to show the elements of the invention and the working thereof to supportably elevate and lower a common elongate member between a lowered and an elevated position.

In FIG. 1, an elongate member 1 comprising an auger tube 2 and attendant support truss 6 is shown supported in an upper position by an undercarriage 24 which supportably rests on an axle 22 with wheels 21. The axle 22 and wheels 21 comprise a base which is part of undercarriage 24, and are shown as resting on the ground 72. Lower undercarriage arm 25 has an inner end 29 attached to base 20, and an opposite, outer end 26 pivotably mounted on lower undercarriage arm mount 12 by pivot means 27. In this case, the pivotal attachment is to a member of the truss 6 which strengthens auger tube 2, and is located at a point nearer the first end 3 of the auger than the second end 4 thereof.

Truss 6 extends along the central portion of auger tube 2 for maintaining the integrity of the auger tube in a straight line. The truss comprises longitudinal truss members 57 connected to auger tube 2 by upright braces 8 and cross braces 9. Center splice plates 11 are joined to connect the two halves of the elongate member 1 together into a unit. Center brace 10 is connected to truss members 57 and splice plates 11 for stiffening thereof.

An undercarriage lift arm 31 is also attached at its inner end 32 to base 20, and extends outwardly to support the elongate member 1. At its outer end 36, lift arm 31 is attached to roller support means 54 which is adapted to move along longitudinal rail means 7. The latter is attached to elongate member 1 and is generally coextending with a portion thereof. In this embodiment, rail means 7 is shown as generally located closer to the second end 4 than the first end 3 of the elongate member 1. Rail means 7 may comprise a member attached to elongate member 1. In FIG. 1, rail means 7 is shown in an alternate form as comprising a portion of truss member 57 itself.

Riser post means 40 is attached to the lower undercarriage arm 25 and extends generally upright from base 20. Included in riser post means 40 is one or more riser post 41 having riser post sheave means 44 mounted to the upper portion thereof. The elongate member 1 is supported by riser post means 40 while the latter elevates elongate member 1 from the lowered position, and while lowering elongate member 1 to the lowered position.

A winch cable 46 has one end wound on a winch 18 mounted by winch mount 19 to elongate member 1. The cable communicates with roller support means 54 and may be alternately retracted and extended to move roller support means 54 along rail means 7. As cable 46 is retracted by winch 18, roller support means 54 draws lift arm 31 toward an upright position, providing at least a portion of the force which elevates elongate member 1. During this operation, lift angle 51 between elongate member 1 and lift arm 31 is increased. As cable 46 is extended, roller support means 54 moves toward the second end 4 of the auger and lift arm 31 rotates about base 20 toward a more recumbent position, lowering second end 4 of auger 2 and decreasing lift angle 51.

Central sheave means 80 is mounted on elongate member 1 to guide cable 46 between winch 18 and roller support means 54. When elongate member 1 is in a lowered position, cable 46 is guided on central sheave means 80 and supported by riser post sheave means 44. A lowered position is defined as any position of the elongate member at which cable 46 is supported on riser post sheave means 44 to reduce the load on either or both of arms 25 and 31. For example, while lowering elongate member 1 to a generally recumbent position, the fraction of the total load which is transferred from the arms 25 and 31 to riser post 41 becomes increasingly greater. In this invention, elongate member 1 may even be lowered to, and lifted from, a point where lift angle 51 is negative. At and below the lower position where retraction of cable 46 produces no upward force on roller support means 54 to lift arm 31, all of the load normally on arms 31 and 25 is transferred to riser post 41.

The design of truss 6 is dependent upon the stiffening required to maintain the integrity of the elongate member 1. While truss 6 is shown as below auger tube 2, it may alternatively be above tube 2, as a tensioned cable system for example. The embodiment shown in FIGS. 1 and 12, uses a downwardly extending triangular truss supporting central sheave means 80 at a point furthest from auger tube 2. In the prior art, this truss design would exasperate the high forces required to lift elongate member 1 from the lowermost position. In the present invention, however, the particular lift angle 51 has much less effect because the initial lifting forces are largely borne by riser post means 41 rather than lift arm 31.

The maximum elevation to which elongate member 1 may be lifted is dependent upon the length of lift arm 31. The lift arm must not be lifted to a position where angle 51 is 90 degrees or more. Preferably, angle 51 should not exceed about 80 degrees, to ensure that sufficient reverse force is available to move roller support means 54 in a direction away from central sheave means 80 when it is desired to lower the elongate member.

In FIG. 1, central sheave means 80 is shown as comprising one or more pairs of support sheave blocks 14. The sheave blocks are spaced so that when elongate member 1 is in a lower position, riser post 41 will intersect the cable between the two sheave blocks 14 in each pair of sheave blocks. The cable 46 from the winch 18 passes through one sheave block 14, over riser post sheave means 44, and through the other sheave block 14, so that a portion or all of the downward force exerted by the elongate member 1 is transferred by cable 46 to riser post 41.

Return sheave block 16 is shown attached to elongate truss member 57 of elongate member 1, and is required for certain cable arrangements to be later described.

Central sheave means 80 may be located at any location along elongate member 1. When located nearer the second end 4, riser post means 40 of greater height is required to elevate member 1 to a given position. Greater leverage is achieved at the second end, and less downward force is exerted by elongate member 1 on undercarriage lift arm 31. Preferably, central sheave means 80 is mounted on the elongate member between 25 and 75 percent of the distance from the first end 3 to the second end 4.

Riser post 41 is most easily constructed to extend in a straight line generally upward, but may also take other forms. The post may, for example, be alternatively constructed to follow the curvature of a circle having its center at pivot means 27. In FIG. 1, riser post 41 is shown as attached to lower undercarriage arm 25 by connecting member 43.

Preferably, riser post means 40 comprises two riser posts 41, one on either side of the elongate member 1 so that the latter is elevated and lowered in the space between the two riser posts 41. Each riser post has a sheave means 44 at its upper portion, and central sheave means preferably comprises two pairs of sheave blocks, one pair on each side of elongate member 1 to guide cable 46 onto one of the riser posts 41. With this arrangement, the elongate member is cradled by the pair of riser posts 41 when in a lower position, resulting in enhanced stability. Such stability is required for over-the-road movement of long conveyors.

The use of auger conveyors generally requires that one end be lifted while the other, opposite end is kept at a constant elevation. For example, grain may be introduced into a hopper at the first end 3 at ground level, and conveyed to the top of a silo or other storage structure to be discharged at a higher elevation. Thus, the elongate member is generally inclined with the first end 3 generally stationary and the second end 4 moveable upwardly and downwardly. With such a conveyor, the auger within auger tube 2 is typically rotated by an electrical or hydraulic drive located in auger head cap 5.

It also may be desired to move an elongate member 1 uniformly between a lower and a higher elevation. In this case, both lift arms 25 and 31 pivot about base 20 so that both first end 3 and second end 4 are elevated together.

Figure 2:
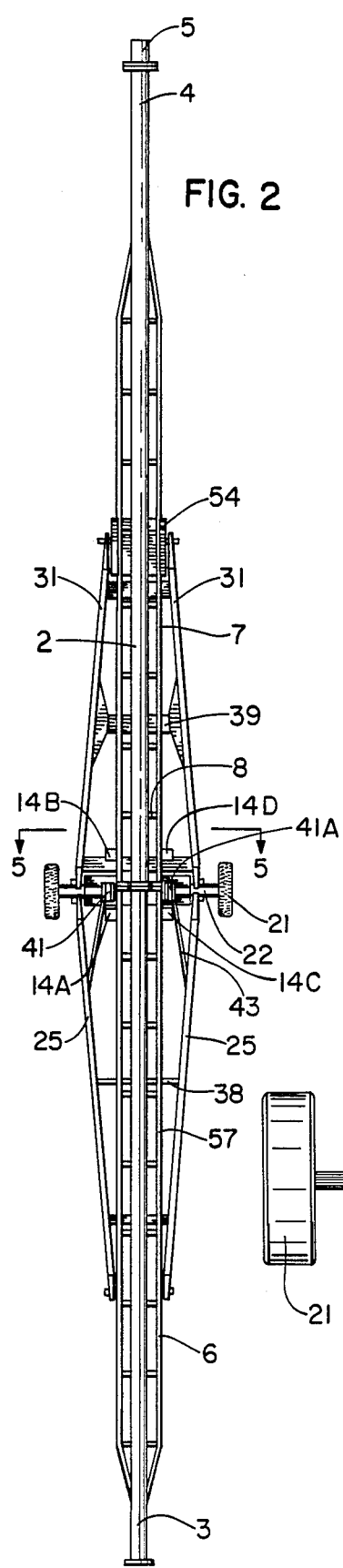
FIG. 2 is a partial plan view of the embodiment of FIG. 1.

Turning now to FIG. 2, the transportable auger conveyor of FIG. 1 is shown in plan view. The first end 3 of the auger tube is shown at the bottom of the drawing, and is typically attached to a hopper (not shown) for introducing the material to be transferred. Auger head cap 5 is attached to the second end 4 of the auger tube, and typically contains a drive unit (not shown) for rotating the auger and moving the material to the second end 4 where it is discharged to a receiving structure. Truss 6 comprises part of elongate member 1 for maintaining the integrity thereof. The auger must be maintained in a straight line to prevent damage by bending. In truss 6, two elongate truss members 57 are shown connected to auger tube 2, one on each side thereof.

Four support sheave blocks 14 are shown as blocks 14A, 14B, 14C and 14D attached to longitudinal truss member 57.

Two lower undercarriage arms 25 are connected by braces 38 to form an integral unit. Arms 25 are pivotably attached to truss 6 and are connected to axle 22 having wheels 21. Two undercarriage lift arms 31 are connected by brace 39 to form an integral unit, and are pivotably connected to axle 22 and to roller support means 54. The latter rides on rail 7 which is shown as attached to truss member 57.

Two riser posts 41 and 41A are shown as extending upwardly between sheave blocks 14A and 14B, and 14C and 14D, respectively. Each riser post is connected to a lower undercarriage arm 25 by a connecting member 43 so that the riser posts 41 and 41A are at a constant angular relationship with arms 25. As a result, the riser posts will always be between the pairs of sheave blocks 14 on each side of the truss 6. The cable (no shown) passing through each pair of sheave blocks 14 will be intersected by a riser post 41 or 41A as elongate member 1 is lowered from an upper position toward a lower position.

FIG. 3 shows the apparatus in schematic form in both a lower position A and an upper position C. The lower position A as shown is not necessarily a lowermost position, nor is the upper position C necessarily an uppermost position. For the sake of illustration, it is assumed that auger tube 2 is rotated upwardly about axis 52, which is unsupported but stationary. The auger tube rotates upwardly in a counterclockwise direction, and downwardly in a clockwise direction about axis 52.

At lower position A, auger tube 2 is supported at 4 points. First, it is supported by lower undercarriage arm 25 at arm mount 12. Second, undercarriage lift arm 31 supports auger tube 2 through roller support means 54. The two support sheaves 15 mounted near the center of the truss also support the auger tube. Riser post means 40 comprises one or more generally upright posts having riser post sheave means 44 near their upper end. Riser post sheave means 44 is maintained in longitudinal alignment so that it passes between support sheaves 15 at all lower elevations of the auger tube. In this figure, riser post means 40 is maintained in alignment by connecting member or members 43 attached to lower undercarriage arm 25. The riser post sheave means is also aligned laterally with cable 46 passing under support sheaves 15. Cable 46 is shown as extending from winch 18 to the nearest support sheave 15. The cable passes below the sheave, over sheave means 44, under the other support sheave 15, and then to roller support means 54. In position A, the lift angle 51 between cable 46 and the lift arm 31 lifted thereby is shown as approximately 9 degrees.

When elevated to position C by winch retraction of cable 46, angle 51 increases to provide increased leverage for lifting the elongate member. At a predetermined elevation depending upon the height of riser post means 40, cable 46 disengages from riser post sheave means 44. At this point, the load is transferred from riser post means 40 to roller support means 54, and further elevation is according to simple retraction of support means 54.

In the prior art, the elongate member is totally supported by the two arms 25 and 31. Neglecting friction, the changing location of roller support means 54, and the changing angular position of the elongate member, the tension on cable 46 in the prior art is proportional to 1/tangent of angle 51. The tension at position A where angle 51=9 degrees would be about 3.6 times that at position C, where angle 51=30 degrees. At very small angles, the tension is much greater. For example, the cable tension at 3 degrees would be about 11 times the tension at 30 degrees for the prior art elevating devices. These figures assume a constant downward load on the upper end of lift arm 31.

In the present invention, riser post means 40 increasingly supports the elongate member as it is lowered from the position where cable 46 first comes to rest on riser post sheave means 44. The reason for this is that theoretically, the cable is uniformly tensed throughout its length. Thus, while the tension in cable 46 required to support the load applied to roller support means 54 constantly increases as the elongate member is lowered, the load itself on roller support means 54 is decreasing, reaching zero when angle 51=0 degrees. A much more uniform load on cable 46 results, reducing the winch requirements as well as the necessary cable strength.

Furthermore, the elongate member may even be elevated from a position where the lift angle is slightly negative. A given tension on the cable transfers a high force to the riser post means and a very small downward force vector on roller support means 54. The latter downward force is far outweighed by the upward force exerted on sheaves 15, and the elongate member rises past the zero degree point, where further force on the cable provides an upward force on roller support means 54. This embodiment is useful where the ability to lower the elongate member to a very low position is required.

FIG. 4 shows sheave block support member 53 and attached central sheave means 80 of the transportable auger of FIG. 1. Member 53 is part of the truss 6 and is attached to elongate truss members 57 and 7, the latter also comprising the rail supported by roller support means 54. Riser post means 41 with riser post sheave means 44 is shown in three positions, A, B, and C, relative to member 53.

Attached to the visible side of member 53 are two sheave blocks 14 with support sheaves 15C and 15D. Not visible are corresponding sheave blocks and support sheaves on the opposite side, and the cable passing through those sheaves. Also, the riser post means 40 and riser post sheave means 44 consist in this embodiment of two sheaved posts, one hidden by the other in this view. Return sheave block 16 with return sheave 17 is attached to member 53 for directing portion 46K of cable 46 to roller support means 54, and portion 46J of the cable to sheave 15C. The cable continues as portions 46H to riser post sheave means 44A attached to riser post means 41A. The cable then passes as portion 46G to pass under sheave 15D and extend to roller support means 54 as portion 46F. In this lowered position, a large fraction of the total load is supported by the riser post means.

Central sheave means 80 includes each of the sheave blocks 14 and 16, with sheaves 15 and 17, all of which are attached to member 53 for directing cable 46 onto riser post sheave means 44.

When the elongate member including support member 53 is elevated to an intermediate position, sheaved riser post means 40 is correspondingly lowered in relation thereto, as shown by riser post 41B with riser post sheave means 44B.

When the elevation of support member 53 is such that cable 46 is no longer supported on riser post sheave means 44C, the lifting load is transferred to the roller support means and lift arm, as previously shown.

Figure 5:
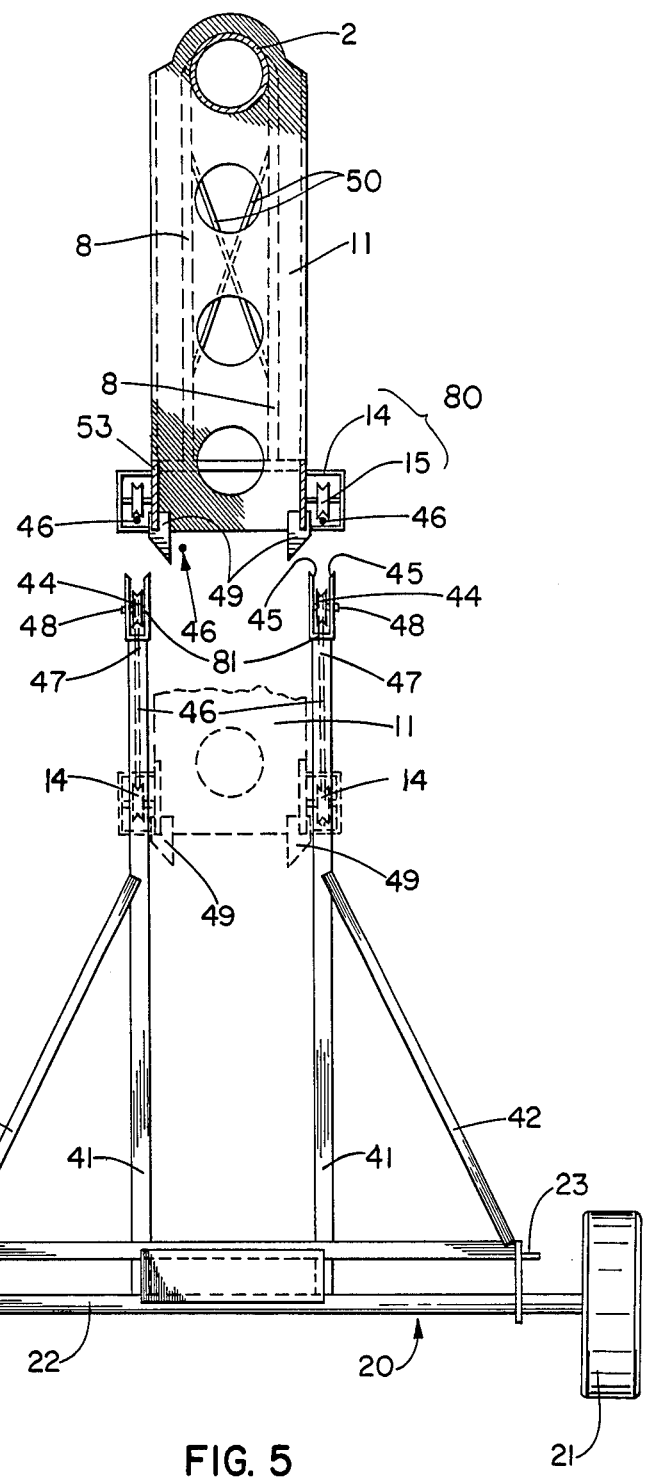
FIG. 5 is a partial end view of the riser post means and base of the invention taken along line 5—5 of FIG. 2, showing the center splice plate and central sheave means in an upper and a lower position relative thereto.

FIG. 5 is an end view of base 20, riser posts 41 and riser posts sheave means 44 of one embodiment of the invention. Wheels 21 are rotatably attached to axle 22 for transport. Two riser posts 41 extend upwardly from the base and are strengthened with side braces 42. Posts 41 are also maintained in the desired position relative to the central sheave means by connecting members 43, not shown in this figure. Pintles 23 are mounted to the base 20 for pivotable attachment of lower undercarriage arm 25 and undercarriage lift arm 31, also not shown. At the upper end 47 of each riser post 41 is sheave means 44 comprising a sheave having a shaft 48 for rotating in riser post sheave block 81. The latter is open at its top and sides to permit cable 46 to be alternately (a) draped over the sheave and (b) to be lifted therefrom. The upper portions of the sheave blocks 81 are shown as shaped to be cable guides 45 for guiding cable 46 into the sheave blocks 81. If desired, the upper portions may be flared to enlarge the cable openings into the sheave blocks.

An exemplary center splice plate 11 and auger tube 2 are shown in an upper position. Splice plate 11 is attached to other members of the truss, including upright braces 8, cross braces 50 and sheave block support members 53. Attached to each of the two members 53 are sheave blocks 14 enclosing sheaves 15. Each of the visible sheave blocks and sheaves has another sheave block and sheave behind it, out of view. The sheave blocks are spaced so that when splice plate 11 is lowered, sheaves 44 on the riser posts 41 intersect the cable 46 passing between each of the front and rear pulleys 15.

Guide means 49 may be attached to member 53 for further assisting the lateral guidance of cable 46 onto sheaves 81. Guide means 49 is shown as having angular lower edges which pass between sheave blocks 81, compensating for misalignment between the elongate member and the riser post.

A section of cable 46 is also shown as passing below the center splice plate. This section of cable corresponds to cable 46K of FIG. 4 passing to and from return sheave 17, not shown in FIG. 5.

The bottom of splice plate 11 is also shown in a lower position where the central sheave means 14 are at a level below the riser post sheave means 44. Sections of cable 46 are shown passing downward from sheave blocks 81 to sheave blocks 14 for support thereof.

Figure 6:
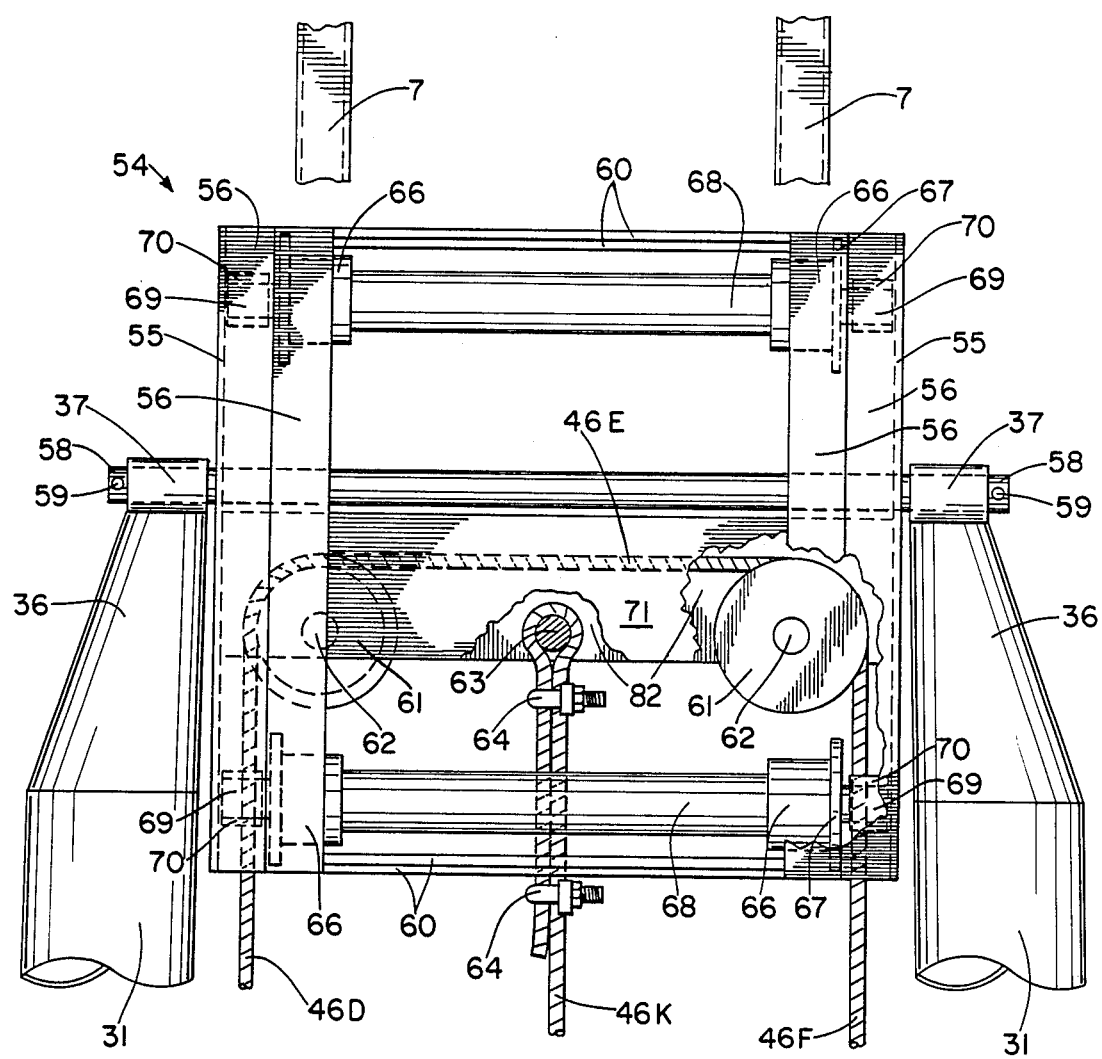
FIG. 6 is a partially cutaway plan view of one embodiment of the roller support means of this invention, showing the attached undercarriage lift arms.
Figure 7:
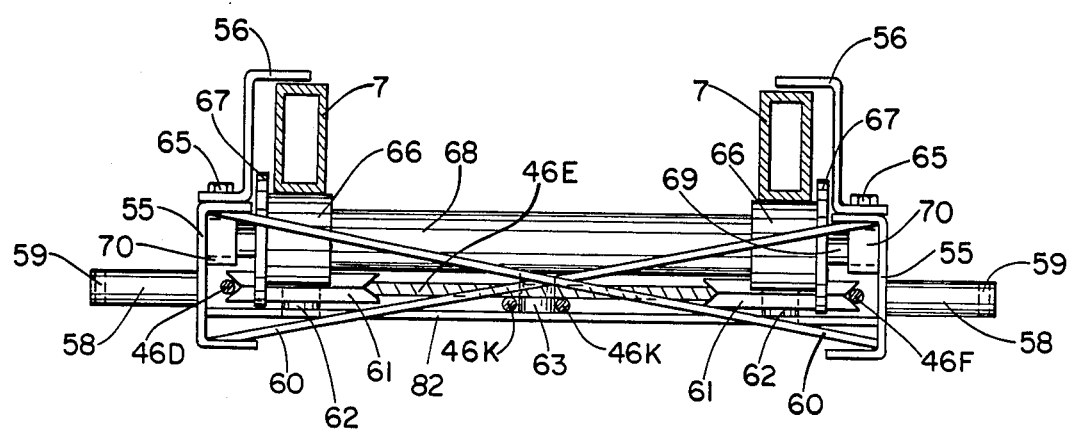
FIG. 7 is an end view of the roller support means of FIG. 6, taken from the cable extension end.

FIGS. 6 and 7 depict one embodiment of roller support means 54 particularly useful for use with long conveyors. Roller support means 54 is shown in plan view in FIG. 6, together with the attached outer ends 36 of lift arms 31. An end view of means 54 is shown in FIG. 7. The view is from the inner end from which winch cable 46K extends to central sheave means 80.

Roller support means 54 is designed to move smoothly along rail means 7 which is attached to, or part of, the elongate member. In this embodiment, rail 7 comprises truss member 57, and roller support means 54 rides along the underside of rail 7 on four spaced wheels 66. Each pair of wheels has a common axle 68 and side axle extensions 69 mounted in bearings 70. Each wheel 66 has a flange 67 on one side for guiding the rail on the wheel.

Two opposed frame members 55 of roller support means 54 are spaced apart and structurally connected by lower cross beam 82, upper cross beam 71 and cross braces 60. Bearings 70 are mounted near the front and rear ends of frame members 55 to provide rotatable support for the wheels 66. A rail housing 56 prevents the roller support means from becoming disengaged from rails 7 if the elongate member should be lifted beyond the normally supported level by some outside force. The housings also act as guards to the moving parts for prevention of accidents. The rail housing 56 may be attached to frame member 55 by bolts 65, as shown, or other means.

A cable anchor 63 is shown securely supported between lower cross beam 82 and upper cross beam 71. Cable 46K is attached to anchor 63 by connectors 64, for controlling the location of means 54 along rails 7.

A pintle 58 passes through frame members 55 and through a trunnion 37 mounted on the outer end 36 of each lift arm 31. Each end of pintle 58 may include a cotter pin hole 59 for securing the trunnions.

Depending upon the particular cable arrangement which is to be used, roller support means 54 may include one or more sheaves 61 for reversing the direction of cable 46. In this embodiment, a pair of sheaves 61 is shown with sheave shafts 62 anchored between the cross beam 82 and cross beam 71. The cable direction is reversed through 180 degrees from cable section 46D, through section 46E to cable section 46F.

FIGS. 8 through 11 illustrate various cable stringing arrangements which are useful with this invention. The particular arrangements shown are not limiting, however. Each arrangement includes winch 18, support sheaves 15 of central sheave means, riser post or posts 41 with sheave means 44, roller support means 54, and a cable strung therebetween. The elongate member having the attached sheaves 15 is consistently shown in a lowered position to be supported by riser post or posts 41.

Figure 8:
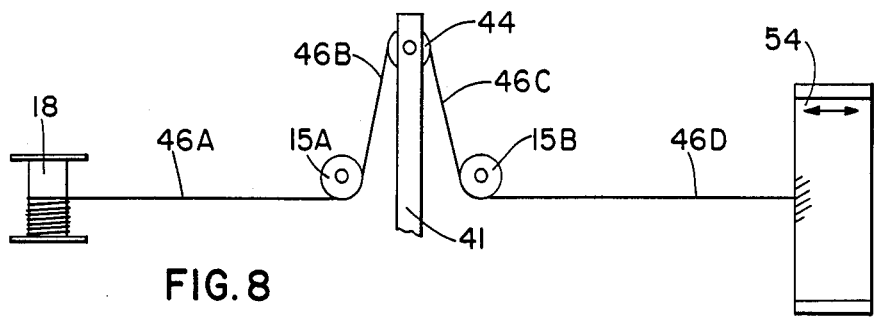
FIGS. 8-11 illustrate four possible cable-and-sheave configurations which may be used with the lift arm configuration shown in FIG. 1.

In FIG. 8, a single non-reversed cable extends from winch 18 as cable section 46A to pass under support sheaves 15A and 15B. Riser post 41 with sheave means 44 supports sheaves 15A and 15B through cable sections 46B and 46C. Cable section extends to roller support means 54 to pull it along the rail or rails, not shown in this diagramatic view.

Figure 9:
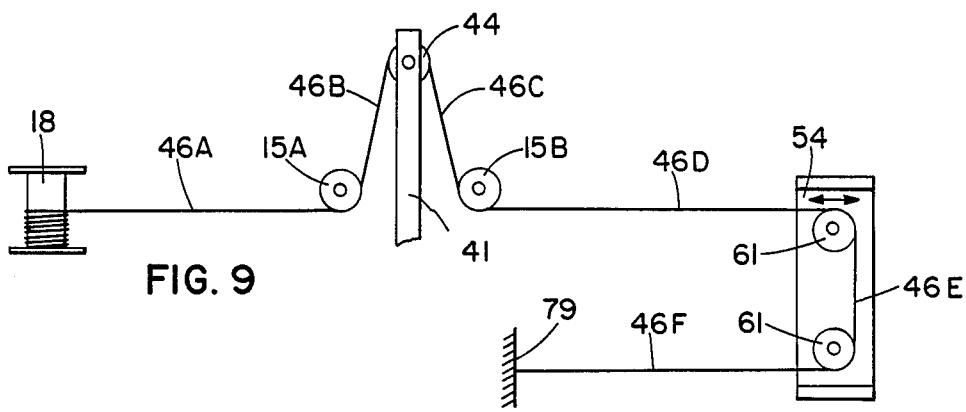

FIG. 9 shows an arrangement similar to that of FIG. 8, but with a single direction reversal of the cable on sheaves 61. In this arrangement, the cable end is anchored at 79 to the elongate member. This arrangement has a theoretical mechanical advantage of 2, when compared to the arrangement of FIG. 8.

Figure 10:
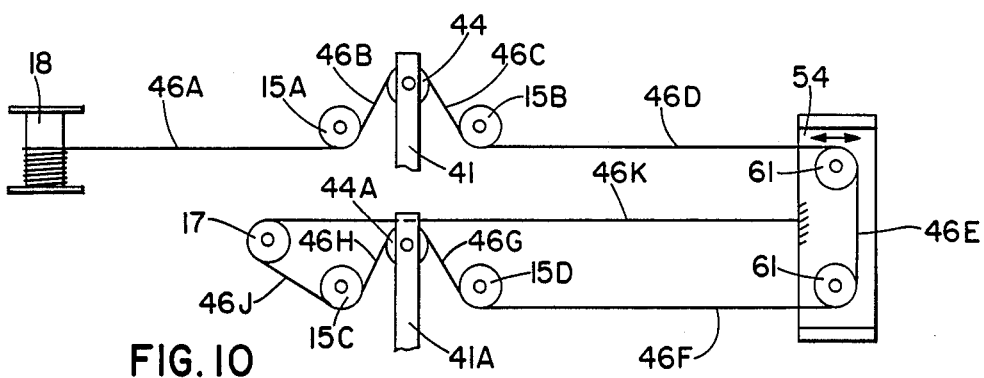

The arrangement of FIG. 10 incorporates two riser posts 41 together with a second set 15C, 15D of support sheaves. The cable 46J from the second set of support sheaves passes to return sheave 17 which passes the cable, as section 46K, to be anchored on roller support means 54. This arrangement provides a theoretical mechanical advantage of 3, when compared to the arrangement in FIG. 8.

Figure 11:
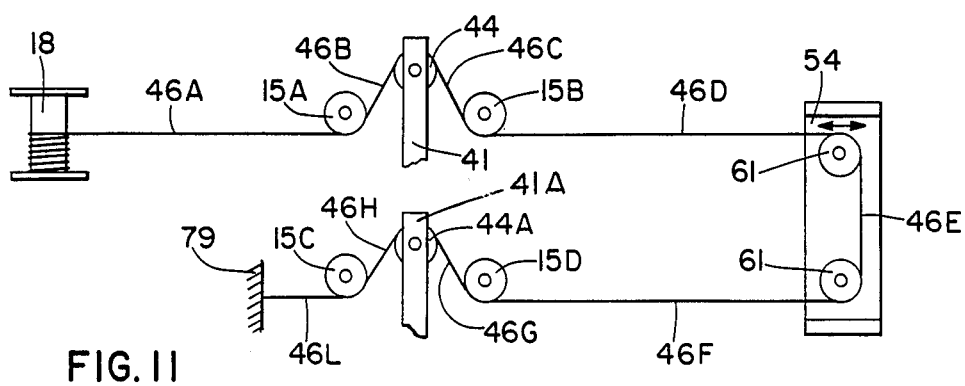

The arrangement of FIG. 11 is similar to that of FIG. 9, except that a second riser post 41 and corresponding set 15C, 15D of support sheaves is included. In this case, sheave 17 is not required, and cable section 46L from sheave 15C is anchored, for example to the elongate member.

Figure 12:
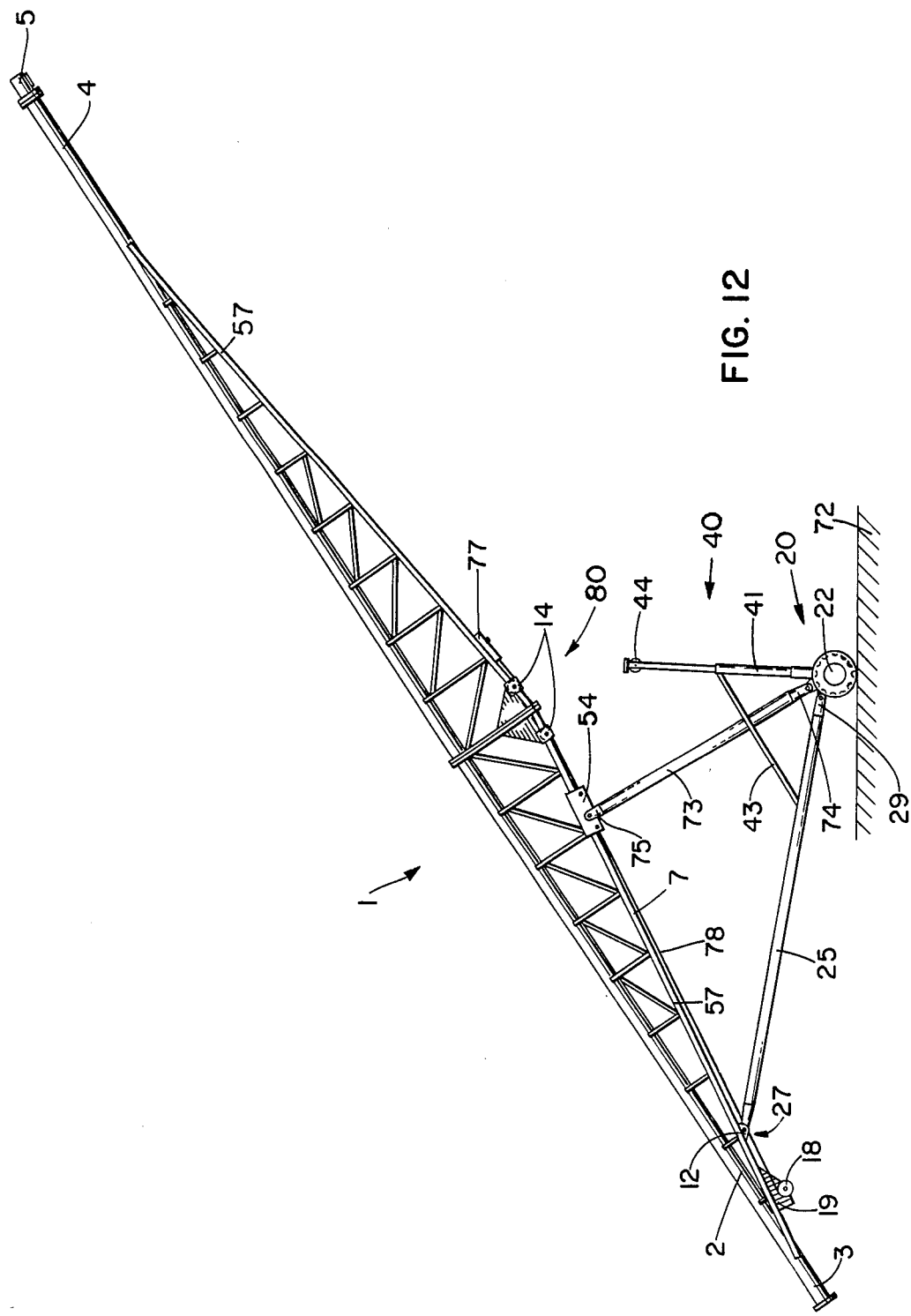
FIG. 12 is a side elevation of another embodiment of the instant invention.

In FIG. 12 is shown another embodiment of the invention. As in FIG. 1, the invention is shown as adapted to elevating and lowering an auger type conveyor. Lower undercarriage arm 25 and undercarriage lift arm 73 both project outwardly from the base, in this case axle 22, on the same side of upwardly extending riser post 41. Lift arm 73 has an inner end 74 pivotably attached to the base, and an outer end 75 pivotably attached to roller support means 54. Rail means 7 is truss member 57 between lower undercarriage arm mount 12 and central sheave means 80. As in the embodiment of FIG. 1, lower undercarriage arm 25 is attached by pivot means 27 to lower undercarriage arm mount 12 on truss member 57.

Riser post means 40 comprises riser post or posts 41 having riser post sheave means 44 at the upper end. Each riser post 41 is attached to lower undercarriage arm 25 by connecting member 43 so that riser post means 40 passes between support sheaves 14 when elongate member 1 is in a lower position.

Winch 18 is shown attached by winch mount 19 to the first end 3 of elongate member 1. As will be pointed out in the discussion of FIGS. 15 and 16, winch 18 may be alternatively be mounted on the opposite side of central sheave means 80, nearer second end 4. In further embodiments, the winch may be mounted on undercarriage lift arm 73 or even base 20, although some loss of efficiency may result.

Cable 78 has one end wound on winch 18, and the other end extends through sheave blocks 14 of central sheave means 80 and to or through roller support means 54. Also shown is return sheave block 77 for returning cable 78 to roller support means 54. Return sheave block 77 contains one or more sheaves and is generally fixed to alongate member 1, being shown in FIG. 12 as attached to truss member 57. Central sheave means 80 and riser post means 40 interact as already described.

When compared to the embodiment of FIG. 1, that of FIG. 12 results in greater leverage of the elongate member working upon the undercarriage lift arm. As a result, downward forces on the undercarriage lift arm are greater than in the prior embodiment, particularly when the elongate member is at an elevated position above the point where riser post means 40 provides support.

Central sheave means 80 may be located at any location along elongate member 1. When located nearer the second end, riser post means of greater height is required to elevate member 1 to the same position. Greater leverage is achieved, however, and the resulting downward force on the lift arm is lower. In the embodiment of FIG. 12, central sheave means 80 is preferably mounted on the elongate member between 35 and 95 percent of the distance from the first end 3 to the second end 4.

FIGS. 13 through 16 illustrate four exemplary cable configurations which may be used with this invention. The configurations shown are not exhaustive.

Figure 13:
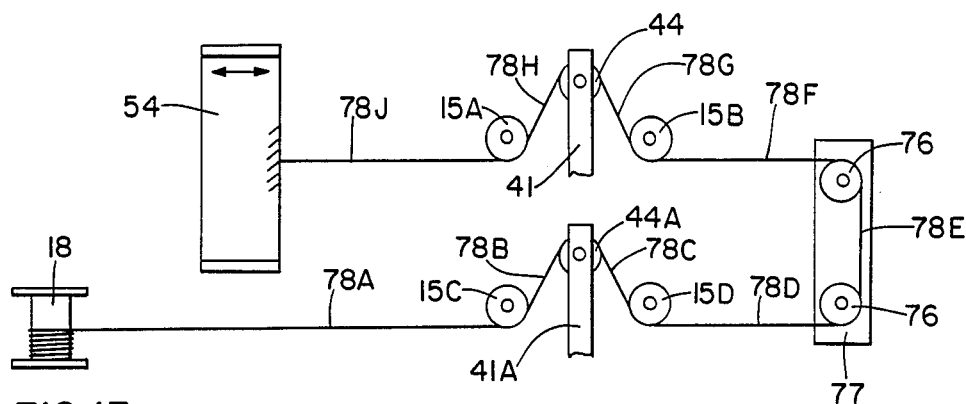
FIGS. 13-16 illustrate four possible cable-and-sheave configurations which may be used with the lift arm configuration shown in FIG. 12.
Figure 14:
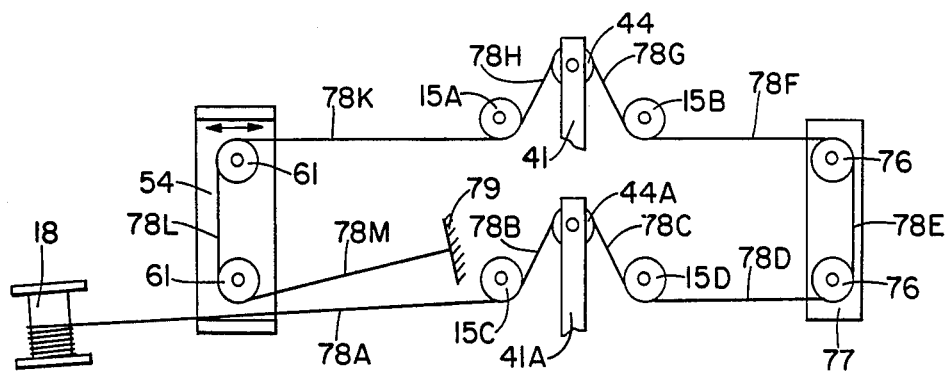

In FIGS. 13 and 14, winch 18 is mounted to elongate member 1 between first end 3 and central sheave means 80, and return sheave block 77 is fixedly mounted to member 1 on the opposite side of sheave means 80. Riser posts 41 and 41A are shown in a position where they support elongate member 1 through sheaves 15A, 15B, 15C and 15D. Winch cable sections 78A through 78J in FIG. 13 and sections 78A through 78M in FIG. 14 draw roller support means 54 toward central sheave means 80 when the cable is taken up by winch 18. In FIG. 1, one end of the cable is anchored to support means 54, while in FIG. 2, one end of the cable is attached to cable anchor 79 on elongate member 1. One or more sheaves 61 on the roller support means reverse the cable direction, so that the mechanical advantage of the embodiment of FIG. 14 is generally double that of FIG. 13.

Figure 15:
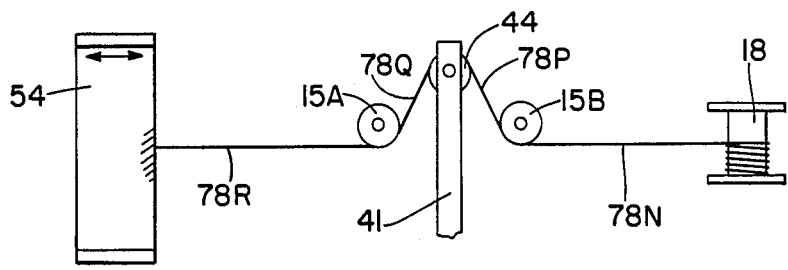

In the simple cable arrangement of FIG. 15, winch 18 is mounted on the opposite side of central sheave means 80, as compared to FIGS. 13 and 14. A single riser post 41 is shown supporting cable sections 78P, 78Q passing under and supporting a single set 15A, 15B of support sheaves. A return sheave block 77 is not used.

Figure 16:
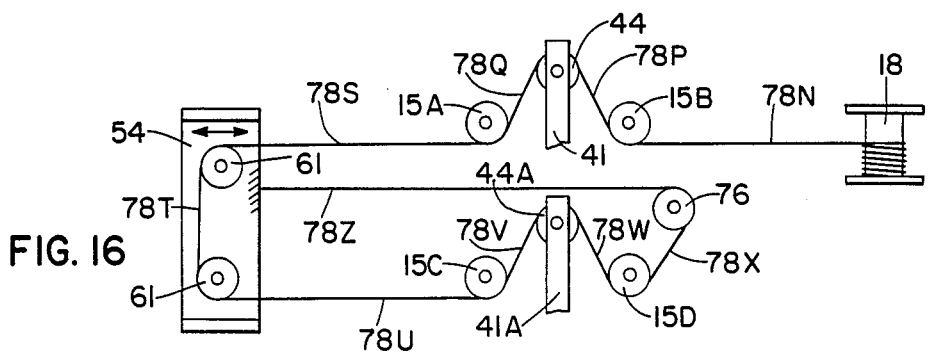

In FIG. 16, winch 18 is mounted as in FIG. 15. Sheaves 61 on roller support means 54 reverse the cable direction, and two sets 15A, 15B and 15C, 15D of support sheaves guide cable sections over riser post sheave means 44, 44A. The cable is directed by return sheave 76 to be anchored in support means 54. The mechanical advantage of this arrangement is three times that of the arrangement of FIG. 13.

Numerous characteristics and advantages of this invention have been set forth in the foregoing description. It will be understood that this disclosure is in many respects illustrative only. Changes may be made in details, particularly in matters of shape, size and arrangement of parts without exceeding the scope of the invention. The scope of this invention is defined in the language in which the appended claims are expressed.

What is claimed is:

1. In combination with an elongate member movable upwardly and downwardly between a lowered position and an elevated position and having first and second ends, an apparatus for supportably elevating and lowering said elongate member between said lowered and elevated positions, comprising:
   longitudinal rail means attached to said elongate member and generally coextending with a portion thereof;
   an undercarriage for supporting said elongate member, comprising:
   (a) a base;
   (b) a lower undercarriage arm having an inner end attached to said base, and having an opposite, outer end pivotably mounted on said elongate member;
   (c) roller support means movably supporting said elongate member along said coextending rail means;
   (d) a load-bearing undercarriage lift arm having an inner end attached to said base and an opposite, outer end attached to said roller support means;
   (e) riser post means attached to said lower undercarriage arm and extending generally upright from said base for supporting said elongate member while elevating said elongate member from said lowered position and lowering said elongate member to said lowered position; and
   (f) riser post sheave means mounted to the upper portion of said riser post means;
   a winch cable operatively associated with said roller support means to mechanically coact therewith;
   a winch having said cable wound thereon for alternately retracting and extending said winch cable to move said roller support means along said generally coextending rail means; and
   central sheave means mounted on said elongate member to guide said cable, said cable being guided on said central sheave means and supportably on said riser post sheave means when said elongate member is in said lowered position whereby said elongate member is supported on said riser post sheave means for supportably elevating and lowering said elongate member between said lowered position and said elevated position.

2. The apparatus according to claim 1, wherein: said elongate member is generally inclined with said first end generally stationary and said second end movable upwardly and downwardly.

3. The apparatus according to claim 1, wherein: said outer end of said lower undercarriage arm is pivotably mounted on said elongate member at a point between said first end and said central sheave means.

4. The apparatus according to claim 1, wherein: at least one of said lower undercarriage arm and said undercarriage lift arm is pivotably attached to said base.

5. The apparatus according to claim 1, wherein: said outer end of said undercarriage lift arm is pivotably attached to said roller support means.

6. The apparatus according to claim 1, wherein: said winch is fixedly connected to said elongated member.

7. The apparatus according to claim 1, wherein: said riser post means is fixedly attached to one of said lower undercarriage arm and said base.

8. The apparatus according to claim 1, wherein: said undercarriage lift arm is generally parallel with said cable between said roller support means and said central sheave means when said elongate member is in said lowered position.

9. The apparatus according to claim 1, wherein: said winch cable guided on said central sheave means is separated from said riser post sheave means when said elongate member is in an uppermost elevated position.

10. The apparatus according to claim 1, wherein: said central sheave means is mounted on said elongate member to lie below a straight line between said winch and said roller support means for maintaining said cable in tension against said central sheave means.

11. The apparatus according to claim 3, wherein: said lower undercarriage arm and said undercarriage lift arm project outwardly from said base on opposite sides of said upwardly extending riser post means, and are attached to said elongate member and said roller support means, respectively, having said central sheave means therebetween.

12. The apparatus according to claim 11, wherein: said central sheave means is mounted on said elongate member between 25 and 75 percent of the distance from said first end to said second end of said elongate member.

13. The apparatus according to claim 3, wherein: said lower undercarriage arm and said undercarriage lift arm project outwardly from said base on the same side of said upwardly extending riser post means, and are attached to said elongate member and said roller support means, respectively, on the same side of said central sheave means.

14. The apparatus according to claim 13, wherein:

said central sheave means is mounted on said elongate member between 35 and 95 percent of the distance from said first end to said second end of said elongate member.

15. The apparatus according to claim 1, wherein:
said riser post means comprises two upwardly extending posts, each having a sheave mounted in the upper portion thereof for receiving a cable, said posts spaced apart normal to said elongate member for supportably passing said elongate member therebetween.

16. The apparatus according to claim 15, wherein:
said central sheave means comprises two pairs of sheaves, each said pair comprising a sheave on each side of each said riser post sheave when said elongate member is in a lowered position, to guide said cable thereon.

17. The apparatus according to claim 1, wherein:
said elongate member is a conveyor for moving materials from a first location to a second location.

18. The apparatus according to claim 1, wherein:
said elongate member is a continuous auger enclosed in a tube, said tube strengthened in the central portion of its length by a truss network.

19. The apparatus according to claim 18, wherein:
said truss network is on the underside of said auger tube.

* * * * *